United States Patent
Warner et al.

(10) Patent No.: US 8,948,325 B1
(45) Date of Patent: Feb. 3, 2015

(54) METHOD AND APPARATUS FOR DIGITAL POST-DISTORTION COMPENSATION OF SIGNAL NON-LINEARITIES

(71) Applicant: PMC-Sierra US, Inc., Sunnyvale, CA (US)

(72) Inventors: William D. Warner, Maple Ridge (CA); Clarence K. L. Tam, Saint-Laurent (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 4 days.

(21) Appl. No.: 13/834,133

(22) Filed: Mar. 15, 2013

(51) Int. Cl.
*H04L 25/08* (2006.01)
*H04L 25/49* (2006.01)

(52) U.S. Cl.
CPC ..................................... *H04L 25/08* (2013.01)
USPC ............................................ 375/346; 375/297

(58) Field of Classification Search
CPC .... H04L 27/2647; H04L 27/38; H04B 7/005; H04B 1/1027
USPC ............... 375/346, 297, 298; 455/114.3, 63.1
See application file for complete search history.

(56) References Cited

U.S. PATENT DOCUMENTS

| | | |
|---|---|---|
| 6,724,331 B1 | 4/2004 | El-Ghoroury et al. |
| 6,794,938 B2 | 9/2004 | Weldon |
| 7,009,536 B1 | 3/2006 | Gaus, Jr. |
| 7,020,447 B2 * | 3/2006 | Nagatani et al. ............ 455/114.3 |
| 7,408,491 B2 | 8/2008 | Bock et al. |
| 7,848,452 B2 * | 12/2010 | Hayashi et al. ................ 375/297 |
| 7,936,835 B1 | 5/2011 | Zortea et al. |
| 2009/0316826 A1 | 12/2009 | Koren et al. |

OTHER PUBLICATIONS

Quach et al., "A Postdistortion Receiver for Mobile Communications", IEEE Transactions on Vehicular Technology, Nov. 1993, vol. 42, No. 4, pp. 604-616.
Giugno et al., "Adaptive Pre- and Post-Compensation of Nonlinear Distortions for High-Level Data Modulations", IEEE Transactions on Wireless Communications, Sep. 2004, vol. 3, No. 5, pp. 1490-1495.
Valkama et al., "Advanced Digital Signal Processing Techniques for Compensation of Nonlinear Distortion in Wideband Multicarrier Radio Receivers", IEEE Transactions on Microwave Theory and Techniques, Jun. 2006, vol. 54, No. 6, pp. 2356-2366.
Zou et al., "Digital Compensation of Cross-Modulation Distortion in Software-Defined Radios", IEEE Journal of Selected Topis in Signal Processing, Jun. 2009, vol. 3, No. 3, pp. 348-361.
Allen et al., "Digital Post-Processing for Reducing A/D Converter Nonlinear Distortion in Wideband Radio Receivers", Asilomar Conference on Signals, Systems, and Computers, 2009, pp. 1111-1114.

(Continued)

*Primary Examiner* — Khai Tran
(74) *Attorney, Agent, or Firm* — Dennis R. Haszko

(57) ABSTRACT

A method and apparatus to digitally remove in-band nonlinear signal distortion caused by a radio frequency (RF)/intermediate frequency (IF) receiver circuit that has non-linearities, which are further affected by low-IF ADC sample aliasing.

28 Claims, 14 Drawing Sheets

(56) References Cited

OTHER PUBLICATIONS

Valkama et al., "Digital Signal Processing for Reducing the Effects of RF Imperfections in Radio Devices—An Overview", Proceedings of 2010 IEEE International Symposium on Circuits and Systems, 2010, pp. 813-816.

Tsimbinos, "Identification and Compensation of Nonlinear Distortion", PhD Dissertation, University of South Australia, Feb. 1995, pp. 261 pages.

* cited by examiner

METHOD AND APPARATUS FOR DIGITAL POST-DISTORTION COMPENSATION OF SIGNAL NON-LINEARITIES

FIELD

The present disclosure relates generally to non-linear signal distortion in radio-frequency receivers. More particularly, the present disclosure relates to the removal of such non-linearities.

BACKGROUND

Acronyms used in the present disclosure include RF: Radio Frequency; IF: Intermediate Frequency; and ADC: Analog to Digital Converter. Implementation of an RF/IF/ADC receiver chain into an integrated CMOS device is subject to non-linear signal distortion that impairs the ability to correctly recover and decode a desired signal in the presence of undesired signals (non-linearities). As is known in the art, post-compensation of signal distortion, using digital signal processing (DSP), can be used in designing and implementing a highly linear receiver.

FIG. 1 shows an example of prior art RF receiver chain used to receive wireless signals. A signal received at an antenna 50 is amplified using a low noise amplifier (LNA) 52, and then filtered by a filter, for example, a band pass filter 54, to remove harmonic distortion products caused by the non-linearity of the LNA 52. The filtered signal output of the BPF 54 is converted to a lower frequency or intermediate frequency (IF) using a mixer 56 that receives the output of the BPF 54 and the output of a local oscillator (LO) 58. The frequency of the IF (output of mixer 56) is equal to the difference between the frequency of the LO 58 and the frequency of the signal output from the BPF 54. As is known in the art, a mixer such as the mixer 56 works by exploiting the non-linearity of the mixer 56. As such, the IF signal output from the mixer 56 contains harmonic distortions that are to be removed, typically through filtering, by using, for example, a low pass filter 60.

Intermodulation distortion occurring at the same IF frequency as the signal cannot be removed by filtering and can be cause for concern. As the signal received at the antenna 50 is processed by the LNA 52, the BPF 54, the mixer 56, and the LPF 60, the amplitude of the signal diminishes. A programmable or variable gain amplifier (VGA) 62 can be used to boost the signal power; however, the VGA 62 typically introduces harmonic and intermodulation distortion. In many receivers a surface acoustic wave (SAW) filter 64 can be used to tightly filter the signal band of interest. Not only will the SAW filter 64 remove much of the harmonic distortion, it will also remove a significant amount of intermodulation distortion that falls outside the SAW filter bandwidth. Optionally, a second VGA 63 can be positioned to receive the output of the SAW filter 64, and to provide an amplified signal to the ADC 66. Those knowledgeable in the art will appreciate that intermodulation distortion will remain in-band and that it is not possible to remove this through simple filtering.

The ADC 66 samples the output to the VGA 63 and converts this output into digital samples using an Analog-to-Digital-Converter (ADC) 66. Within the ADC 66, non-linearities often exist that impair the signal output from the ADC. As an additional concern, any signal component, desired or otherwise, that lies outside the Nyquist sampling band will be aliased back into the desired band and impair the signal at the output of the ADC 66. Further, the ADC 66 includes a sample and hold (S/H) circuit (not shown). The input bandwidth of the ADC is often many times higher than that of the IF. As such, many orders of distortion can be incurred in the S/H circuit. Also, due to circuit specifics, the non-linearity of the ADC 66 may be modified by a high-pass memory process. That is, there are substantially no distortion products at low frequency due to the S/H circuit. However, due to the S/H circuit operation, signal content above 50% of the S/H clocking rate aliases down below this rate. This is the typical ADC aliasing process known to those knowledgeable in the art.

FIG. 2 shows a representative view of non-linearities incurred in the receiver chain of FIG. 1 up to, but not including, the S/H circuit of the ADC 66. In FIG. 2, it is assumed that the received signal occupies the entire signal channel bandwidth. In FIG. 2, the signal "X" 70 represents the analytic form of the signal (complex signal with no negative frequency component). Of note, the signal "X" 70 is idealized in that it has infinitely sharp roll-off in frequency and is flat across frequency. In practice, this will likely not be the case; however there is no loss of generality in using the "square-shape" signal "X" 70. Finally, the lower frequency portion of each of the signals is labeled "L" while the higher frequency portion of the signal is labeled "H". The labeling is important for clarity when ADC sample aliasing is introduced.

The distortion products up to the third order are shown in FIG. 2. In this particular example, the different distortion products overlap in frequency, but this is not necessarily the case.

In FIG. 2, the second order intermodulation distortion product is identified as "$|X|^2$" 72 as this is the numerical model to generate these terms. "$|X|^2$" 72 can also be referred to as IM2. The IM2 terms from the VGA 63, which can be optional, will typically have little memory (i.e., will not depend significantly on frequency); however the IM2 terms from the front of the circuitry of the ADC 66 may have a high pass memory effect, hence the shape (slope) of "$|X|^2$" 72. For example, the front of the circuitry of the ADC 66 may included buffering circuitry that is part of a sample and hold circuitry.

The third order intermodulation product is identified as "$|X|^2 \cdot X$" 74 and can be referred to as IM3. Contributions to the IM3 term come from all parts of the receiver chain shown at FIG. 1. Prior to the ADC 66, the IM3 contribution will have little dependence on frequency (i.e., they will have little memory); however the IM3 term from the front of the circuitry of the ADC 66 will have a high pass memory effect, hence the shape (slope) of "$|X|^2 \cdot X$" 74 shown at FIG. 2.

The second order harmonic distortion product is identified as "$X \cdot X$" 76 and can be referred to as HD2. Depending on the cutoff frequency of a LPF 65 that can be placed after the second VGA 63, there could be a LPF memory effect (frequency dependence of HD2); however, the portion due to the front of the ADC circuit will have a high pass memory effect.

The third order harmonic distortion product is identified as "$X \cdot X \cdot X$" 78 and can be referred to as HD3. Depending on the cutoff frequency of the LPF after the second VGA 63, these could have a LPF memory effect, however, the portion due to the front of the ADC circuit will have a high pass memory effect.

In reality, the memory effects imposed on the HD2 and HD3 terms will be a combination of low pass from the LPF 60 and high pass due to the nature of the circuitry of the ADC 66. The low pass response of the LPF 65 placed after the second VGA 63 but before the ADC 66, is shown in FIG. 2, at reference numeral 80, and the high pass response of the ADC is shown at reference numeral 82. As further shown at FIG. 2, the high pass response 82 of the ADC 66 non-linearity is less dependent on frequency as the frequency increases. This is expected from the front circuitry of the ADC 66.

FIG. 3A is similar to FIG. 2; however the abscissa (x-axis) of FIG. 3A is now shown in units of sampling frequency $f_{samp}$. In the example of FIG. 3A, the signal "X" 70 lies in the second Nyquist zone. That is, "X" 70 is at a frequency that lies between $0.5 * f_{samp}$ and $f_{samp}$. Thus, the frequency of the signal "X" 70 lies above the Nyquist aliasing frequency $0.5 * f_{samp}$. All signal components existing at the point of the S/H circuitry of the ADC 66 will alias into the first Nyquist zone. The signals in the odd order Nyquist zones will alias into the first Nyquist zone without frequency inversion, while those signals in the even order Nyquist zones, including the signal "X" 70, will alias into the first Nyquist zone with an inversion in frequency. This effect is shown in FIG. 3B. The use of the "L" (low frequency) and "H" (high frequency) labels is to help visualize the zone-folding for each of the signals. In FIG. 3B, the portions of the various signals shown in stippled lines is further folded into the second Nyquist zone.

Further, integration of an RF/IF/ADC receiver chain in CMOS devices is desirable as the integration allows for smaller footprint and reduced power consumption. Unfortunately, implementation of an RF/IF/ADC receiver chain in CMOS is subject to non-linearities, for example, as those described above, that will impair the ability to correctly recover and decode a desired signal in the presence of a larger signals.

FIG. 4 shows an example of performance requirement of a receiver, which is based on: 3GPP TS 45.005, "3rd Generation Partnership Project; Technical Specification Group GSM/EDGE Radio Access Network; Radio transmission and reception", Release 10. The receiver is designed as a wideband multicarrier receiver. In the presence of two strong signals having −43 dBm power each (referred to here as "jammer signals"), it must be possible to recover a weak desired signal (having −101 dBm power) with a signal to noise and distortion ration (SNDR) exceeding 10 dB. Due to receiver non-linearity, intermodulation and/or harmonic distortion, and ADC sample aliasing, distortion products from the jammer signals may fall within the desired signal bandwidth. Combined with other impairments such as thermal and ADC quantization noise, this can degrade the SNDR of the desired signal to less than the required 10 dB.

When the sampled signal contains a desired signal component that has lower than required SNDR the signal needs to be processed to improve the SNDR to acceptable levels. In the intended application, it is sufficient to reduce the distortion products that lie in the bandwidth of the signal of interest. Signal distortion products that lie outside this bandwidth (but still within the bandwidth of the wideband receiver) are not of concern as they can be removed by a downstream process through simple numerical filtering. A number of Digital Signal Processing (DSP) techniques are available to perform this task of in-band signal distortion removal, but they are typically very complex and power consuming. The challenge is to design a method to decrease distortion with sufficient improvement in SNDR without excessive power consumption.

Therefore improvements in the compensation of signal distortions are desirable.

SUMMARY

In a first aspect, the present disclosure provides a method to compensate for non-linearity distortion in a radio frequency (RF) receiver, the RF receiver outputting a digitized RF signal. The method comprises: converting the digitized RF signal into a complex baseband signal; rotating the complex baseband signal to obtain a rotated complex baseband signal at 0 Hz; calculating, as a function of the rotated complex baseband signal, compensation distortion components for a set of pre-determined distortion orders; and subtracting the compensation distortion components from the rotated complex baseband signal to obtain a compensated complex baseband signal.

In a second aspect, the present disclosure provides a method of calculating compensation distortion components factors, the compensation distortion components to compensate for non-linearity distortion in a radio frequency (RF) receiver. The method comprises: receiving, from the RF receiver, a digitized RF reference signal; converting the digitized RF reference signal into a complex baseband signal; rotating the complex baseband signal to obtain a rotated complex baseband signal at 0 Hz; calculating, as a function of the rotated complex baseband signal, compensation distortion components for a set of pre-determined distortion orders; calculating a frequency content function of the a rotated complex baseband signal at 0 Hz; calculating a frequency content function of the each of the compensation distortion component; and for each particular compensation distortion component, dividing the frequency content function of the a rotated complex baseband signal at 0 Hz by the frequency content function of the particular distortion component to obtain the compensation distortion components factor of the particular distortion component.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for to digitally remove in-band non-linear signal distortion caused by a radio frequency (RF)/intermediate frequency (IF) receiver circuit that has non-linearities, which can be affected by low-IF ADC sample aliasing.

Figure 5:
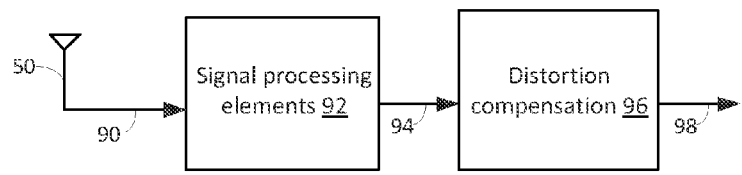
FIG. 5 shows a block diagram representation of an embodiment of the present disclosure.

FIG. 5 shows a block diagram representing an embodiment of the present disclosure. In FIG. 5, an antenna 50 receives a signal 90 which is subjected to signal processing elements 92 that introduce distortion to produce a distorted digital signal 94. The distorted digital signal 94 is processed by a distortion compensation module 96 that removes at least some of the distortion of the distorted digital signal 94 to produce a compensated digital signal 98.

Figure 1:
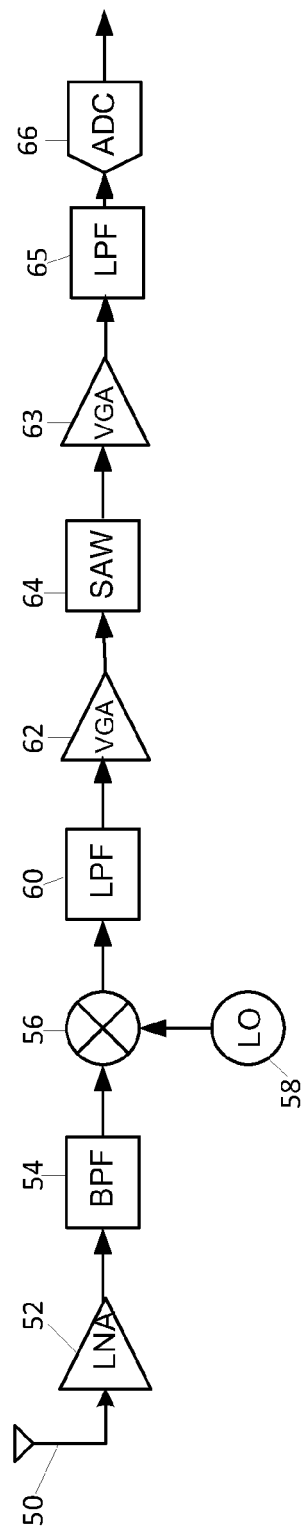
FIG. 1 shows prior art RF receiver chain used to receive wireless signals.
Figure 2:
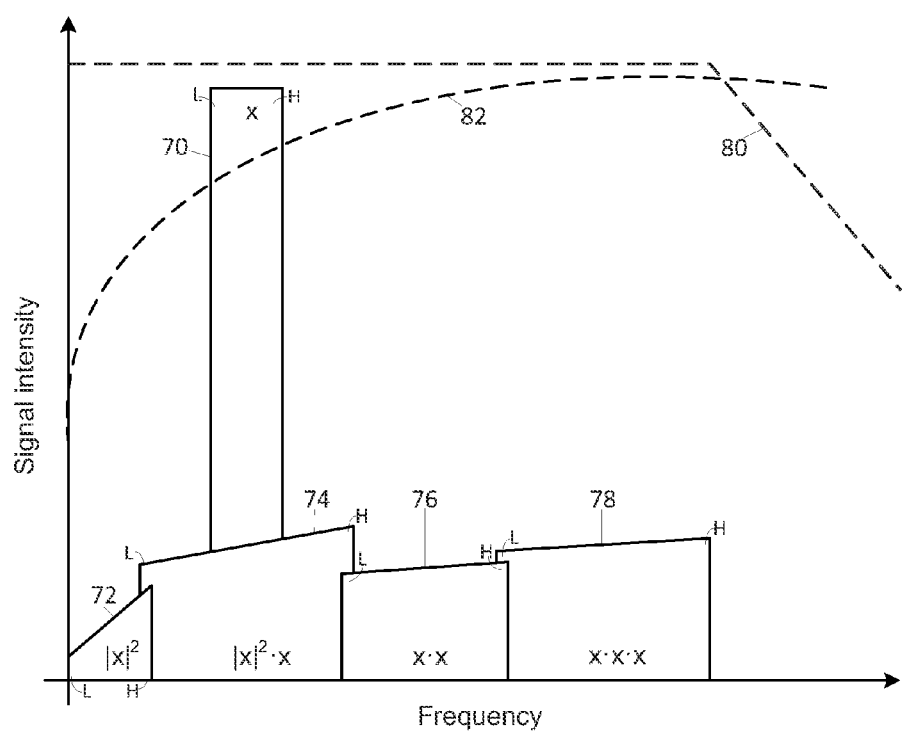
FIG. 2 shows an example of non-linearities that can be incurred in the receiver chain of FIG. 1.
Figure 6:
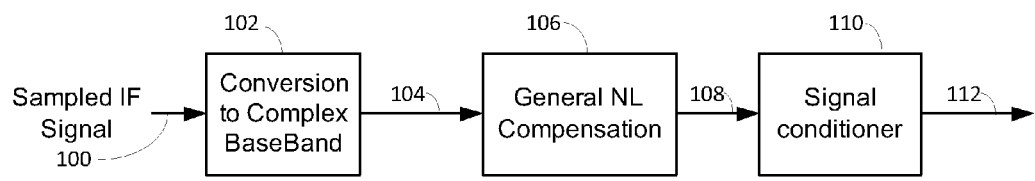
FIG. 6 shows a block diagram representation of another embodiment of the present disclosure.

FIG. 6 shows a block diagram of another embodiment of the present disclosure. A sampled IF signal 100, for example, the output signal of the ADC 66 of FIG. 1, is received by a signal converter 102, which converts the sampled IF signal 100 into a complex baseband signal 104. As is known in the art, the complex baseband signal 104 can also be referred to as an analytic signal. The complex baseband signal 104 is input into a signal compensator 106, which compensates for non-linearities in the complex baseband signal 104 and outputs a compensated signal 108. The compensated signal 108 is provided as an input to a signal conditioner 110, which outputs a conditioned signal 112.

The IF signal received at the ADC 66 of FIG. 1 is sampled, prior to the signal converter 102 of FIG. 6, at a frequency $F_{samp}$, which can be selected as a function of the intermediate frequency. For example, when $F_{samp}$=4IF, the signal to be sampled will be centered in the first Nyquist zone. Compensation of the non-linear distortion is performed at complex baseband, thus the first step is to convert the real-only sampled IF signal 100 to complex baseband. Subsequent to non-linear compensation at the signal compensator 106, a variety of output conditioning options can be provided at the signal conditioner 110.

There are two well-known approaches that can be used to convert the real-only sampled IF signal 100 into the complex baseband signal 104. Any of these approaches can be used without departing from the scope of the present disclosure. One approach includes subjecting the real-only IF signal 100 to a complex frequency rotation followed by applying low pass filtering to remove negative frequency component that have been aliased through the frequency rotation process. Another approach includes filtering the real-only IF signal 100 with a Hilbert filter The Hilbert filtered version of the real-only signal is then injected as the quadrature phase signal component (labeled as "Q"), thus converting the IF signal 100 to its analytic form. Once this is done, the complex signal can be simply rotated in the complex frequency domain to align the complex signal band at DC, i.e., it is rotated to be centered at 0 Hz. This is done by multiplying the analytic signal by a rotating complex vector.

Either of these methods can be used. The following describes examples where the approach using Hilbert filtering is used.

Figure 7:
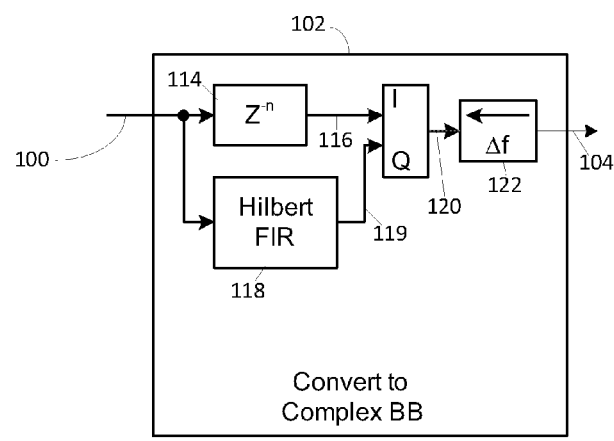
FIG. 7 shows an example of a Hilbert-based apparatus that converts an input signal into a complex baseband signal in accordance with the present disclosure.

The basic structure of the Hilbert based conversion to complex baseband is shown in FIG. 7. In FIG. 7, the signal converter 102 receives the sampled IF signal 100, which is real (i.e., the IF signal does not have an imaginary component). The sampled IF signal 100 is subjected to a digital delay 114, which results in the "I" signal 116. The sampled IF signal 100 is also subjected to a Hilbert filter 118, which can have a finite impulse response (FIR). The Hilbert-filtered version of the sampled IF signal 100 is added to the I signal as the quadrature phase signal component 119 (labeled as "Q"), thus converting the sampled IF signal 100 signal into a complex signal 120, which has the analytic form $Z(t)=I(t)+jQ(t)$ with "j" being the imaginary unit. Once the conversion of the sampled IF signal 100 from real-only to complex is done, the complex signal 120, which does not have any negative frequency components, can be rotated in the complex frequency domain to align the complex signal band at DC (frequency=0). The rotation is effected by a frequency shifter 122, which multiplies the analytic signal 120 by a rotating complex vector. At the output of the signal converter 102, is the complex baseband signal 104.

In general, performance of the Hilbert filter 118 improves with increasing number of filter taps. As the signal of interest approaches +/−fsamp/2 (where fsamp is the ADC sampling frequency), the demands on the Hilbert filter 118 also increases. Thus, the demands on the Hilbert filter are minimized when the IF signal is centered at fsamp/4. If the IF signal is not centered, the demands on the Hilbert filter are dominated by the side which is closest to an integer multiple of fsamp/2. Centering the IF signal maximizes this distance.

Also, the demands on the Hilbert filter 118 are reduced with the bandwidth of the desired signal (the signal that is to be measured) bandwidth relative to the sampling bandwidth.

Figure 3B:
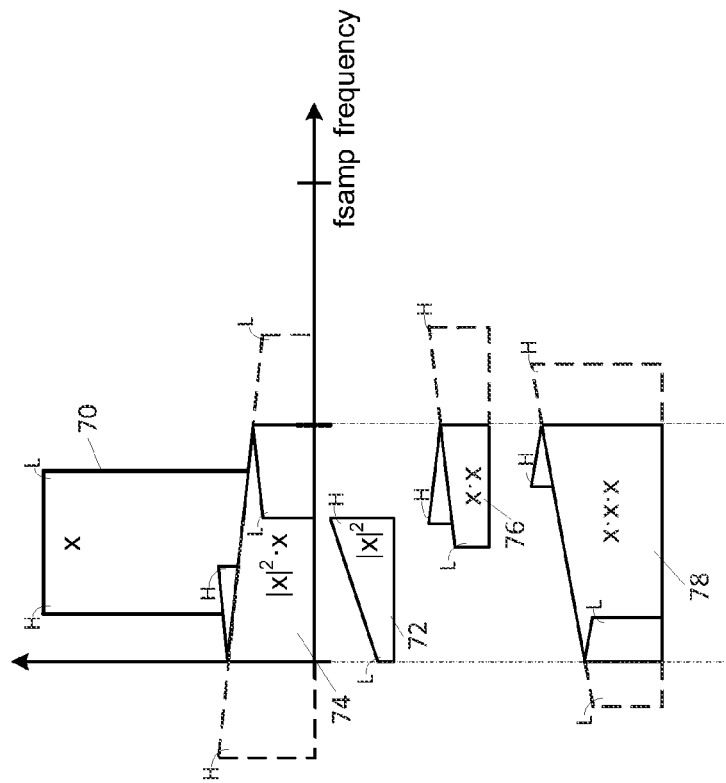
FIG. 3B shows the non-linearities of FIG. 3A aliased in the first Nyquist zone.

In FIG. 3B, the individual distortion products were shown in graphical form. The general compensation technique of the present disclosure includes generating these individual distortion components using a complex baseband version of the distorted digital signal 94 (shown at FIG. 5) as the reference, then subtracting these individual distortion components from the received signal.

It is important to realize that due to the conversion to complex baseband, the spectral folding and aliasing will be different than for the original sampled signal at IF. More specifically, the sample bandwidth at complex baseband is twice the bandwidth of the real-only IF signal.

Figure 8:
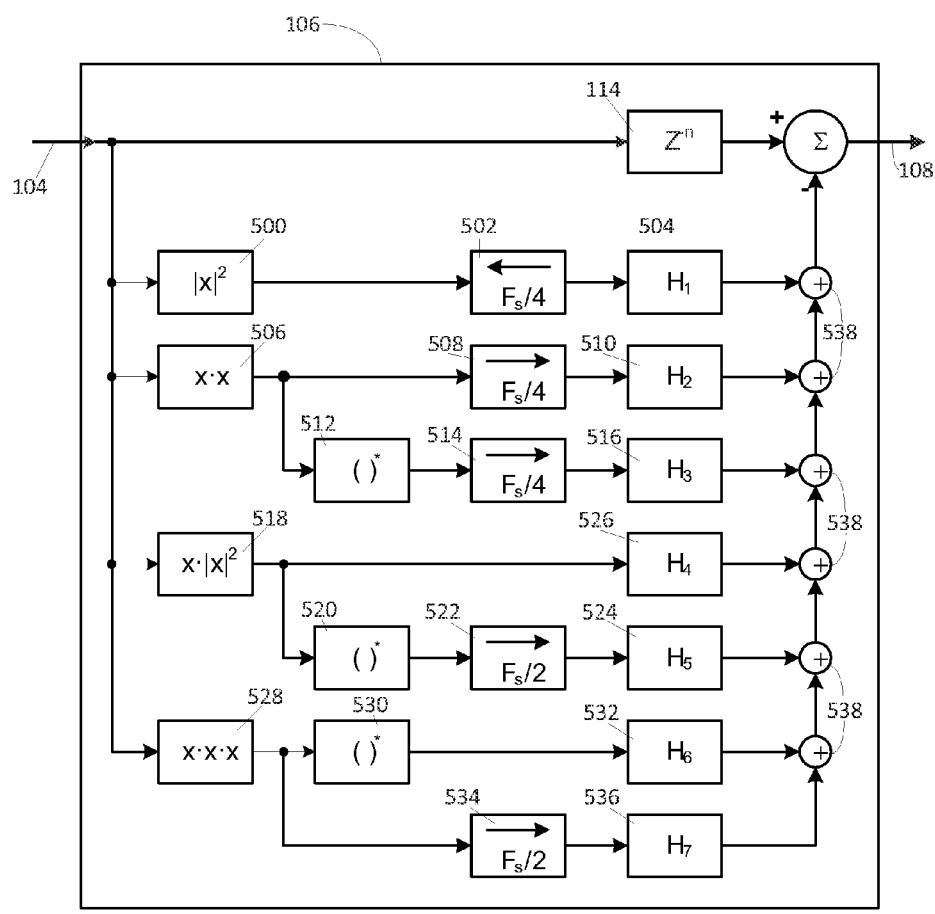
FIG. 8 shows an embodiment of a distortion compensator in accordance with the present disclosure.
Figure 9:
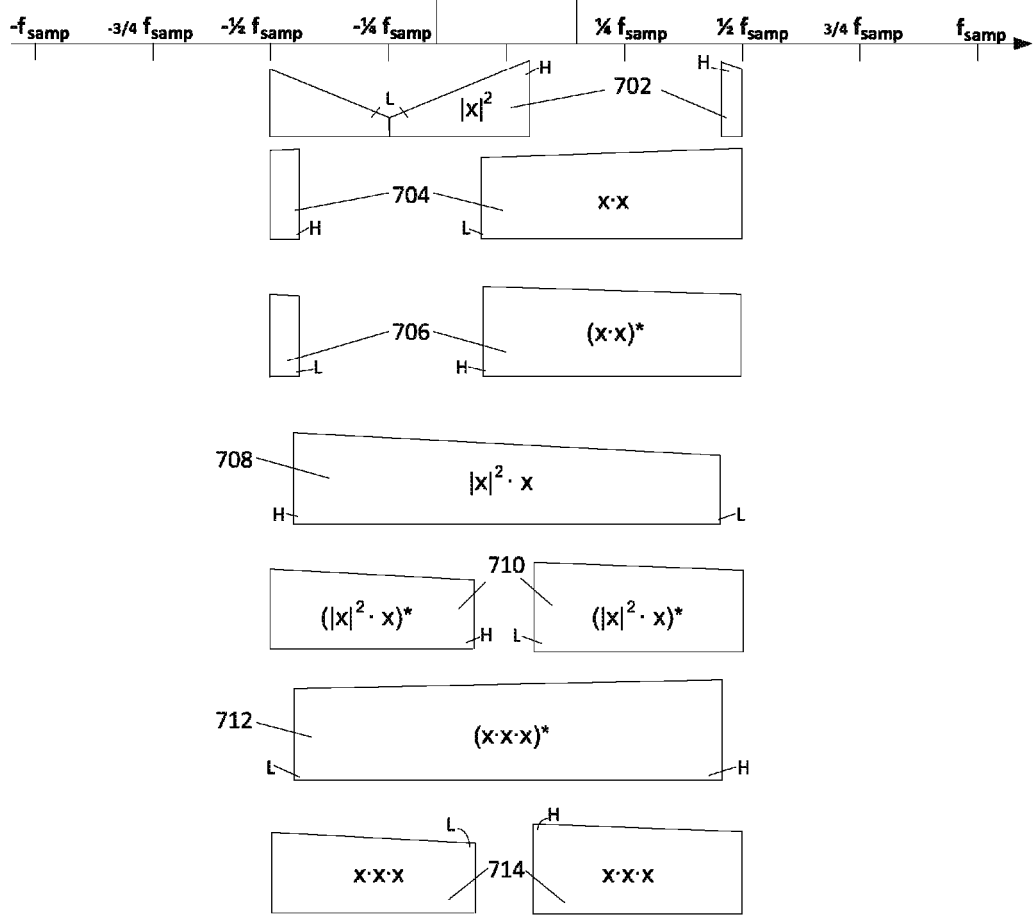
FIG. 9 shows a main signal and the distortion components compensated by the distortion compensator of FIG. 8.

FIG. 8 shows the general compensation architecture when considering only second and third order distortions and when the sampled IF signal 100 is centered in a Nyquist sampling band. In this example, seven different distortion products are generated and subtracted from the received signal. FIG. 9 shows a signal spectrum point of view to assist in describing the compensation procedure.

In FIG. 9, the signal "x" is shown at reference numeral 700. The second order intermodulation distortion product "$|X|^2$", shifted by $-f_{samp}/4$ is shown at reference numeral 702; the second order harmonic distortion product "X·X", shifted by $+f_{samp}/4$ is shown at reference numeral 704; and the complex conjugate of the second order harmonic distortion product "X·X", shifted by $+f_{samp}/4$ is shown at reference numeral 706. Further, the third order intermodulation product "$|X|^2 \cdot X$", un-shifted, is shown at reference numeral 708; the complex conjugate of the third order intermodulation product "$|X|^2 \cdot X$", shifted by $+f_{samp}/2$, is shown at reference numeral 710. Finally, the complex conjugate of third order harmonic distortion product "X·X·X", un-shifted, is shown at reference numeral 712; and the third order harmonic distortion product "X·X·X", shifted by $+f_{samp}/2$, is shown at reference numeral

Figure 3A:
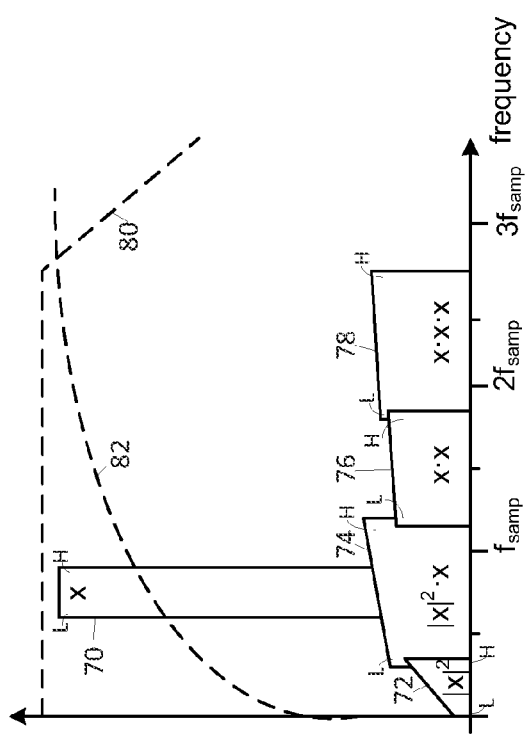
FIG. 3A shows the non-linearities of FIG. 2 but with the abscissa labeled as a function of a sampling frequency.
Figure 4:
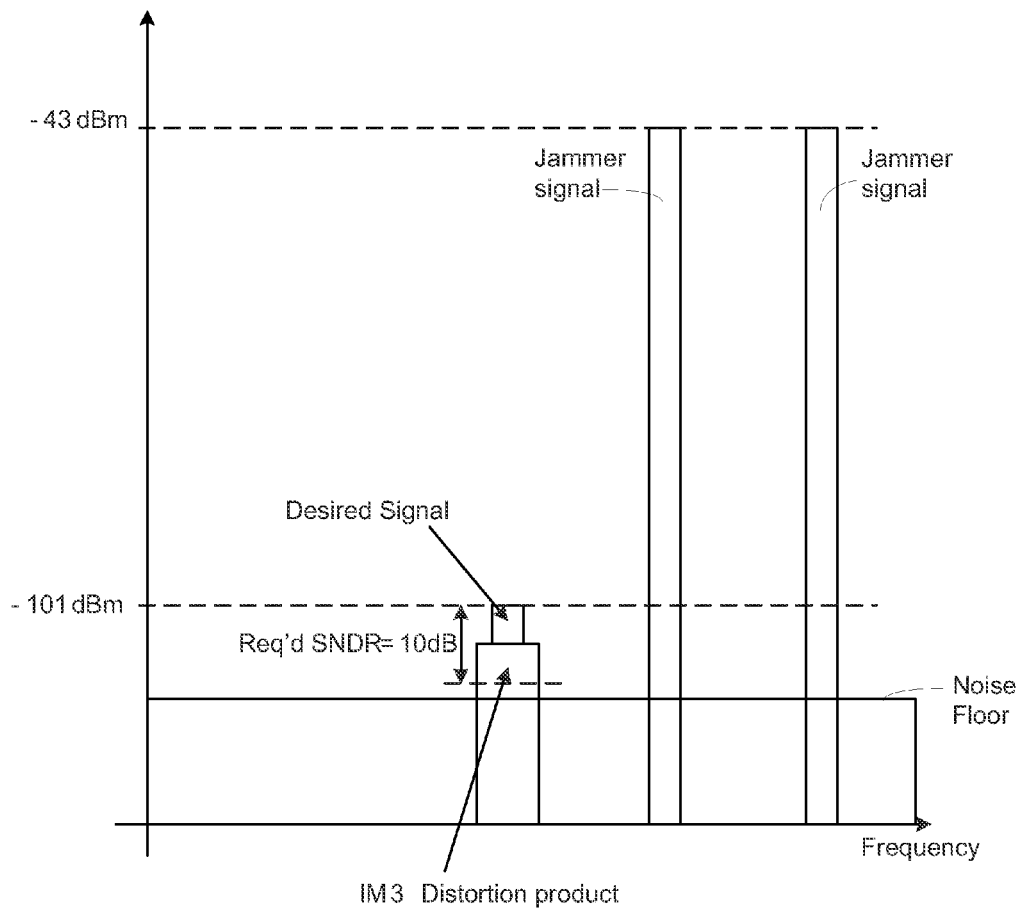
FIG. 4 shows an example of performance requirement of a receiver.

714. As in FIGS. 3A and 3B, high frequency (H) and low frequency (L) portions of each of the signal and signal components have been labeled in FIG. 9.

Referring again to FIG. 8, the complex baseband signal 104 is the input to the signal compensator 106. The signal compensator 106 generates the seven distortion components (shown at reference numerals 702, 704, 706, 708, 710, 712, and 714 at FIG. 9) that are frequency shifted and/or modified by a linear function: H1, H2, H3, H4, H5, H6, or H7. Depending on the extent of memory in the non-linear distortion (i.e. the frequency dependency of the distortion), the H1-H7 functions may be simple scalars, or could be finite impulse response (FIR) filters. Detailed system analysis and characterization is required to determine whether scalars are sufficient for H1-H7, or whether they need to be generalized to FIR filters. For an actual device, calibration is performed to determine the required settings for H1-H7.

The decomposition and compensation of the non-linear distortion into the seven identified components allows for the use of scalar H1-H7 terms in the presence of some levels of non-linear memory. Memory that causes differences between the different distortion components is easily handled by the separation of the seven compensation components. Use of non-scalar H1-H7 terms is required only when the non-linear memory is sufficiently strong to cause the phase/gain characteristic of that component to change more than compensation accuracy requires.

In FIG. 8, the second order intermodulation distortion (IM2) is computed, at reference numeral 500, as $|X|^2$. This signal component spans from DC to twice the signal bandwidth, just as for the IM2 component of the low-IF signal. To properly remove this signal from the complex baseband signal, it must first be shifted in frequency, at reference numeral 502, by $-f_{samp}/4$. The shifted signal is then modified, at reference numeral 504, by H1.

The second order harmonic distortion (HD2) must be compensated by two separate components, since the original HD2 distortion at IF is folded at $f_{samp}/2$. At reference numeral 506, the HD2 compensation is computed as X·X. At 508, X·X is rotated by $f_{samp}/4$ and, at 510, it is modified by H2. At reference numeral 512, the complex conjugate of X·X is taken and, at 514 is rotated by $f_{samp}/4$. At 516, it is modified by H3. If the bandwidth of the signal is small enough relative to the sampling bandwidth, these distortion products will not overlap the signal band of interest and there is thus not need to include the X·X terms in the compensation.

The third order intermodulation distortion (IM3) is computed at 518 as $X·|X|^2$. A conjugate copy is obtained at 520, which is rotated by $f_{samp}/2$ at 522 to cancel the double folds of the IM3 impairment. Subsequent the rotation at 522, the signal is modified at 524 by H5. Also, $X·|X|^2$ (copy thereof) is provided, at 526, directly to H4 for modification. If the bandwidth of the signal is small enough relative to the sampling bandwidth, these distortion products will not overlap the signal band of interest and thus do not need to be included in the compensation. For example, referring now again to FIG. 9, if the bandwidth of the signal "X" 700 is small enough relative to the sampling bandwidth, the distortion components 710 may not overlap with the signal "X" 700. In such a case, this distortion components need not be considered.

Returning to FIG. 8, the third order harmonic distortion (HD3) is computed, at 528, as X·X·X. A conjugated copy of X·X·X·X is obtained at 530 and is modified, at 532, by H6, to cancel the main portion of the HD3, while X·X·X·X is rotated, at 534, by Fs/2, and modified at H7 to cancel the double folds of the HD3 impairment. Referring now again to FIG. 9, if the bandwidth of the signal "X" 700 is small enough relative to the sampling bandwidth, the distortion components 714 may not overlap with the signal "X" 700. In such a case, this distortion components need not be considered.

The outputs of H1-H7 are summed together at 538, and the sum of the outputs H1-H7 are subtracted, at 540, from the complex baseband signal 104, which has been time-delayed at 114 to account for processing time of the distortion terms. Depending on the processing time, the digital delay at 114 can be range from 1 to several tens of sample periods. The output 108 is the compensated signal.

Figure 10:
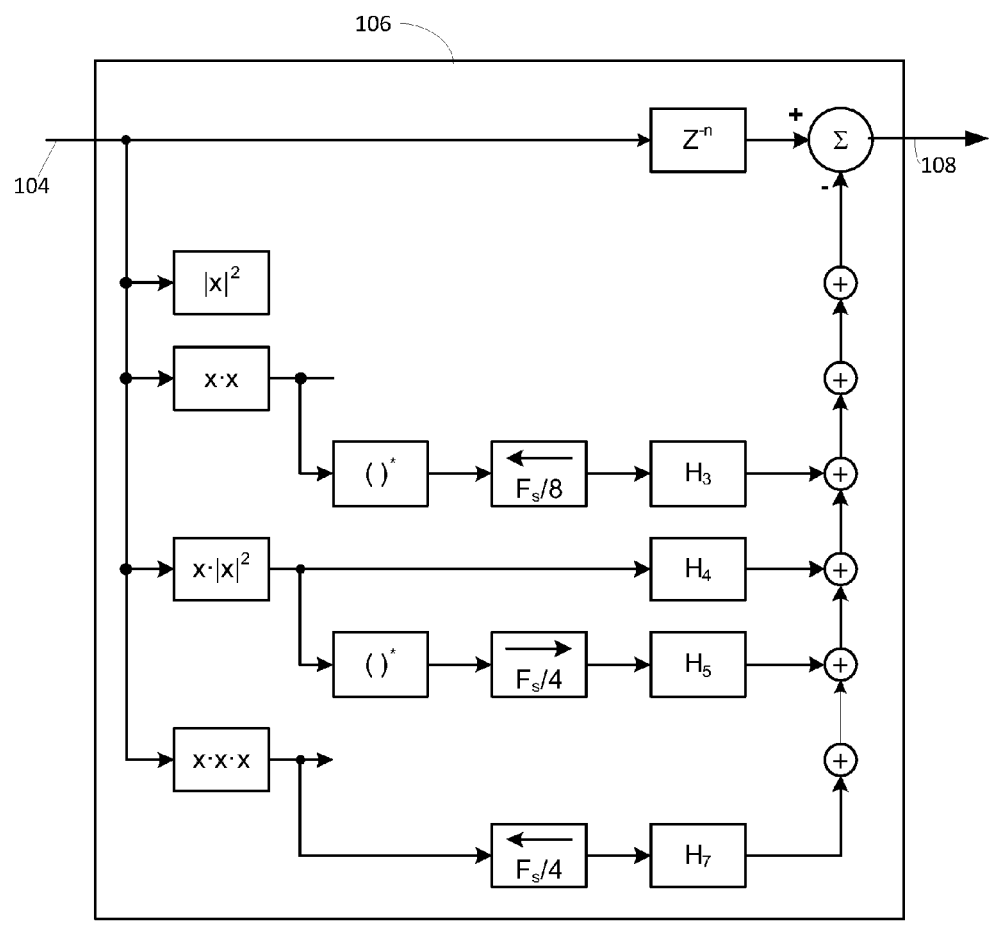
FIG. 10 shows another embodiment of a distortion compensator in accordance with the present disclosure.
Figure 11:
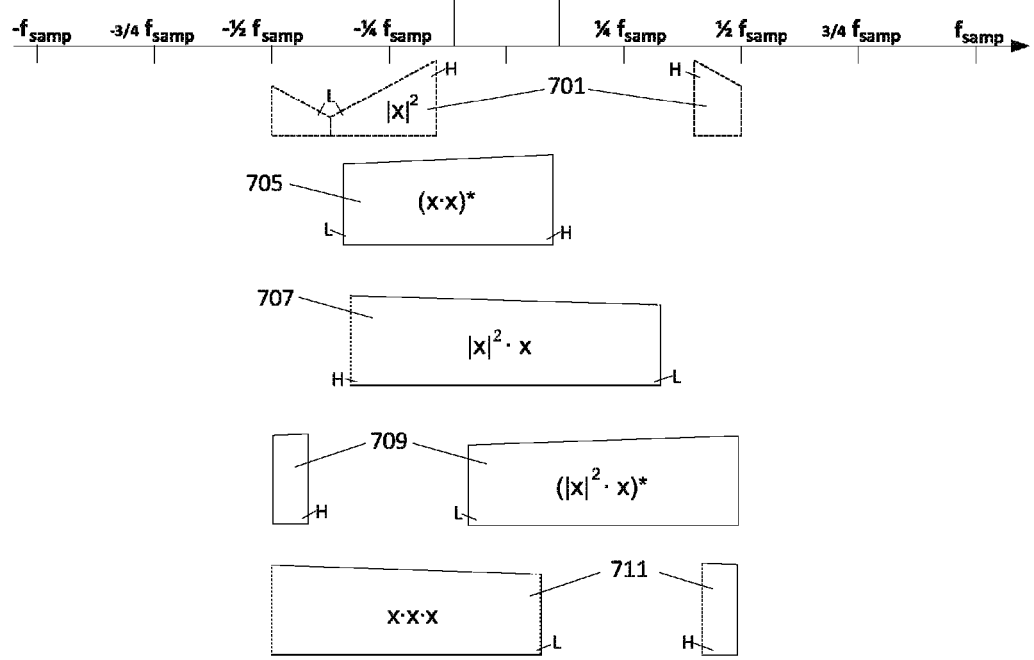
FIG. 11 shows a main signal and the distortion components compensated by the distortion compensator of FIG. 10.

When the sampled signal is significantly offset from the center of a Nyquist band, the distortion compensation principles are the same, but some specific changes can be made to optimize performance. An example of a modified compensation structure is shown at FIG. 10. FIG. 11 shows a signal spectrum point of view to assist in describing the compensation procedure. In the example of FIG. 10, the sampled signal is centered at $\frac{5}{8}·f_{samp}$ (which is half-way between the Nyquist band center at ¾·fsamp and the edge of that band at ½·fsamp). The concept of compensation is the same for this case, just the details have changed. As can be seen in FIG. 10, the H1, H2, and H6 terms are not required and are set to zero. Furthermore, the frequency rotation required for some of the components has changed to the indicated amounts.

In FIG. 11, the signal "x" is shown at reference numeral 700. The second order intermodulation distortion product "$|X|^2$", shifted by $-3f_{samp}/8$ is shown at reference numeral 701. As 701 does not overlap in frequency with signal "x" 700, it is not required, and therefore, is not included in FIG. 10. The complex conjugate of the second order harmonic distortion product "X·X", shifted by $-f_{samp}/8$ is shown at reference numeral 705. Further, the third order intermodulation product "$|X|^2·X$", un-shifted, is shown at reference numeral 707; the complex conjugate of the third order intermodulation product "$|X|^2·X$", shifted by $+f_{samp}/4$, is shown at reference numeral 709. Finally, the third order harmonic distortion product "X·X·X", shifted by $-f_{samp}/4$, is shown at reference numeral 711. As in FIGS. 3A and 3B, high frequency (H) and low frequency (L) portions of each of the signal and signal components have been labeled in FIG. 11.

Figure 12:
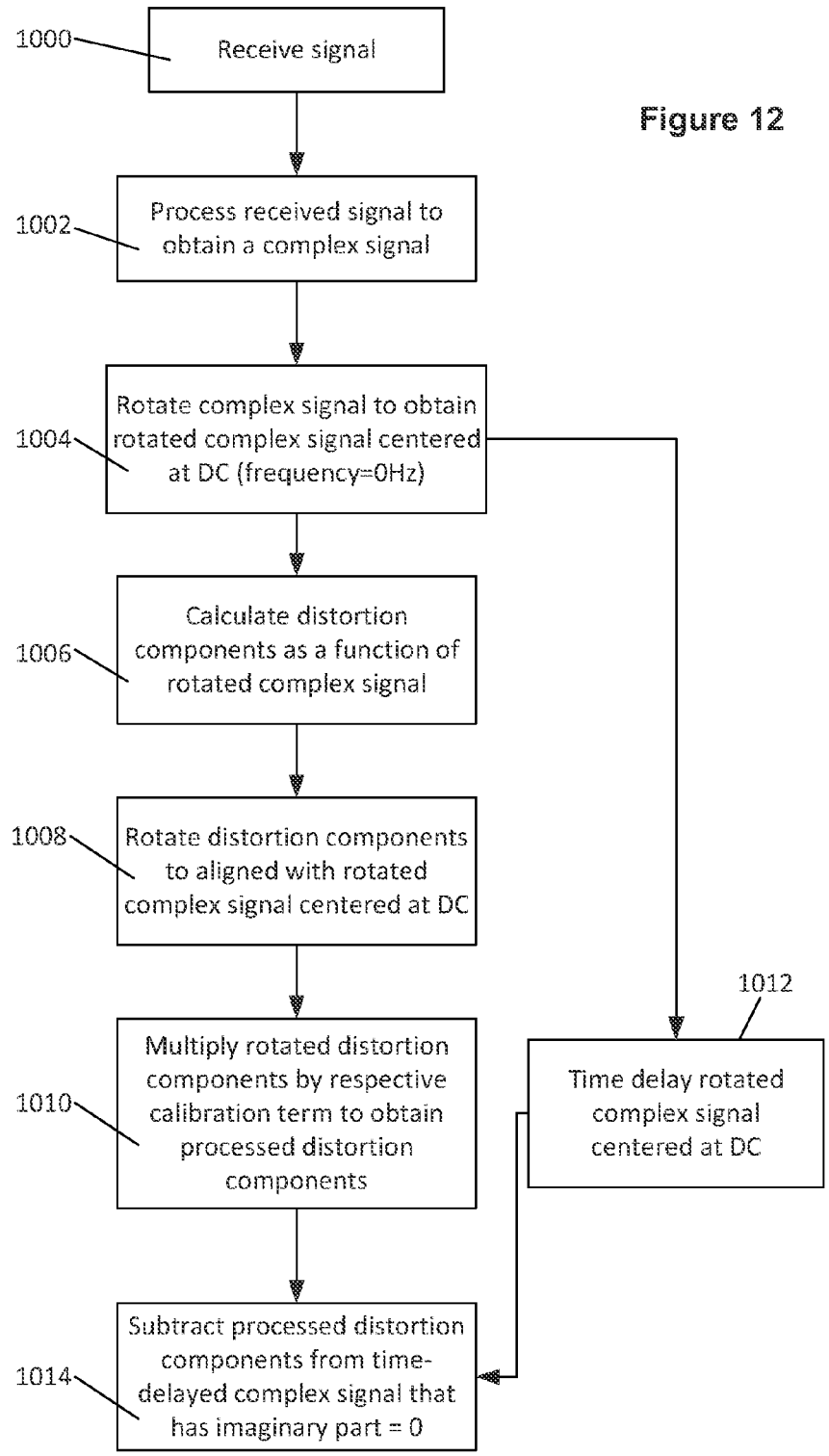
FIG. 12 shows a flowchart of a distortion compensation method according to certain embodiments of the present disclosure.

FIG. 12 is a flowchart of a method according to certain embodiments of the present disclosure. At action 1000, a signal (a real signal) having distortion elements, for example, a signal output from a receiver chain such as shown at FIG. 1, or, simply a signal output from an ADC, is received. At action 1002, the received signal is processed to generate a complex baseband signal, which can also be referred to as a complex signal. As an example, the complex signal can be generated in any suitable way such as, for example, by processing using Hilbert filtering as described in relation to the example of FIG. 7, or, by subjecting the signal 100 (see FIG. 7) to a complex frequency rotation followed by applying numerical filtering to remove negative frequency component that have been aliased through the frequency rotation process.

Returning to FIG. 12, at action 1004, the complex signal obtained at action 1002 is rotated to obtain a rotated complex signal that is centered at 0 Hz (at DC). At action 1006, the distortion components of interest are calculated as a function of the complex signal centered at DC. The distortion components of interest are those that are determined to be the ones that contribute the most to the degradation of the signal received at the input of a receiver chain such as shown, in the example of FIG. 1. In the example of FIGS. 8 and 10, only second and third order distortion components are considered.

At action 1008, the distortion components are individually rotated to align, in frequency, with the distortion components of the signal obtained at action 1004. Subsequently, at action 1010, the rotated distortion components obtained at action 1008 are multiplied by respective calibration terms, which can be scalars or finite impulse responses (FIRs).

At action 1012, the rotated complex signal obtained at action 1004 is time-delayed by an amount substantially equal to the time to carry out action 1006-1010. At action 1014, the rotated distortion components multiplied by their respective calibration terms are subtracted from the time delayed complex signal obtained at action 1012, which result in a distortion-compensated signal.

Figure 13:
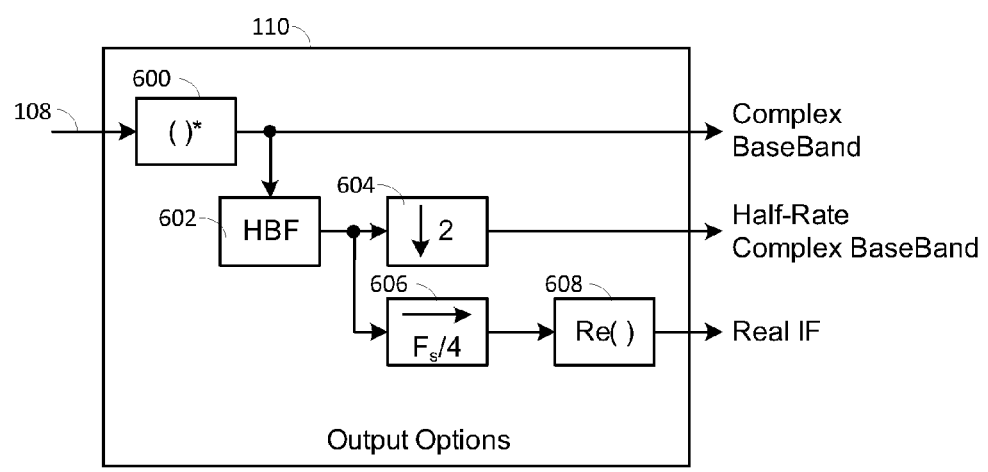
FIG. 13 shows a signal conditioner in accordance with the present disclosure.

Following the compensation of the receiver non-linearity, there are several options available for conditioning/formatting of the output data at the signal conditioner 110 shown at FIG. 6. Some signal conditioning options are shown at FIG. 13.

With sampling of the receive signal in the second Nyquist band or another even numbered Nyquist band, the recovered signal will be inverted in frequency. This can be corrected by applying the complex conjugate function 600 to the compensated signal 108 (negating the imaginary component). With sampling of the received signal in the third Nyquist band, or another odd numbered Nyquist band, the recovered signal will not be inverted in frequency and conjugation is not required. Further, the output of the complex conjugate function 600 can be provided to a half-band filter 602 whose output can be entered into a "decimation by factor of two" module 604. The output of this module 604 is the complex baseband but at half the frequency of the complex baseband output by the complex conjugate function 600. Furthermore, the output of the half-band filter 602 can be frequency shifted by $+f_{samp}/4$ at the shifter module 606. The real part of this frequency-shifted output can be obtained by the real-part function 608.

Calibration of the signal compensator 106, shown at FIG. 6, is as important as the signal compensator itself. The calibration process can be described as (1): calibrate the signal compensator 106 in factory, at one or more operational/environmental conditions (e.g., temperature); (2): during operation of the signal compensator, monitor the operational/environmental conditions and adjust the compensation terms H1-H7 based on pre-determined, stored factory calibration data.

The following describes a calibration procedure that generates the complex polynomial coefficients necessary to compensate for IM2, IM3, HD2 and HD3 distortion terms at the output of the signal converter 102 shown at FIG. 6. The following procedure uses a defined set of calibration signals to stimulate and expose the non-linearities. Observing these non-linearities enables the computation of the required coefficients. This procedure can be implemented as part of a manufacturing process as the compensation is dependent on the non-linearities of the CMOS device (or any other suitable device) and external components that are part of the receiver chain.

For each calibration signal of a set of calibration signals, each calibration signal being generated by a signal generator, the calibration signal (i.e., a known signal) is input into a receiver chain, for example, the receiver chain embodiment shown at FIG. 1. For each calibration signal, the output of the ADC 66 is sampled and captured.

For each calibration signal, the output of the ADC 66 is converted to a complex baseband signal. For each complex baseband signal, polynomial coefficients representing the various non-linearity components are determined.

Figure 14:
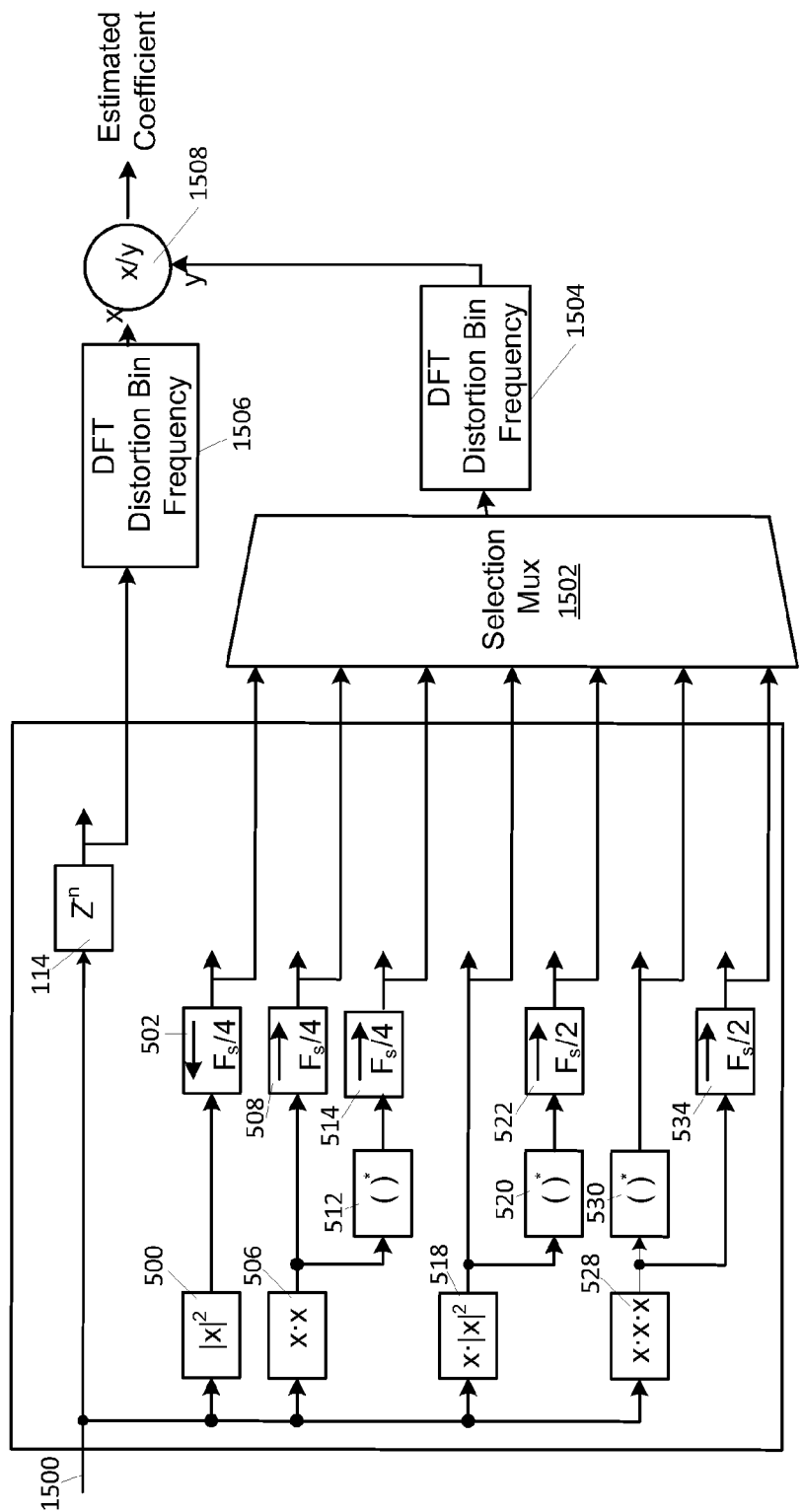
FIG. 14 shows an embodiment of a calibration apparatus in accordance with the present disclosure.

As an example, the details of computing the individual calibration coefficients for the setup of FIG. 8 are shown in FIG. 14. A digitized RF reference signal 1500 is received after having traversed an RF transmitter that is being calibrated. The digitized reference signal 1500 is processed essentially as described in relation to the complex baseband signal 104 of FIG. 8, with the exception that the calculated signals stemming form 502, 508, 514, 518, 522, 530, and 534 are, in the example of FIG. 14, provided, one at a time through, for example, a selection multiplexer 1502, to a discrete Fourier transform module 1504 that calculates the frequency content function of the signal selected at 1502. At 1506, another discrete Fourier transform module 1506, calculates the frequency content function of the signal stemming from 114. Finally, a ratio calculating module 1508 calculates the ratio of the output of 1506 and the output of 1504, to obtain the calibration coefficient (or an estimate thereof).

The magnitude and phase of each distortion component is computed for the distorted receive signal, and for the generated compensation signal. This can be easily done using a Discrete Fourier Transform (DFT) operation. The ratio of the two complex values provides an estimate to the required Hx (x=1, 2, 3, 4, 5, 6, or 7) compensation coefficient. The computation of the compensation coefficients can be done using dedicated on-chip circuitry, or can be done using an on-chip or off-chip general processor.

For the setup of FIG. 8, the minimum number of calibration signals in the set of calibration signals consists of two two-tone signals. That is, there are two calibration signals and each calibration signal is composed of two tones. These two calibration signals allows for the calibration of H1-H7 when H1-H7 can be represented by complex scalars (i.e., the memory effects are weak enough that finite impulse responses (FIRs) are not required).

The two signal frequencies of the calibration signal can be defined as:

$$f_A = f_c - (\Delta f + 2\epsilon) \text{ and}$$

$$f_B = f_c + (\Delta f - \epsilon)$$

where
fc=center frequency of RF signal bandwidth of interest
Δf=frequency offset part 1
ϵ=frequency offset part 2

The Δf term is chosen to cause the distortion components to fall in the region of interest for calibration. The ϵ terms are carefully selected such that the multiple distortion terms do not alias to the same frequency as each other. Also, the ϵ terms can be selected such that the signal distortion terms do not fall on frequencies occupied by spurs resulting from imperfect time interleaved ADC architectures. Another concern when selecting test frequencies (calibration frequencies) is that the distortion components should not alias to a frequency close to one of the two aliased test tone frequencies as LO (local oscillator) phase noise will impair the ability to estimate the phase and magnitude of the distortion component.

The choice of calibration signals is illustrated by way of the following example. Consider a system in which the RF signal bandwidth of interest is 75 MHz wide, centered at 1747.5 MHz. The RF signal is mixed down to an IF frequency of 230.4 MHz using an RF LO with a frequency of 1517.1 MHz. The signal centered at 230.4 MHz is sampled using and ADC clocked at 307.2 MHz. Those knowledgeable in the art will recognize that the IF signal is centered in the middle of the second Nyquist band and the signal occupies approximately 49% of the Nyquist bandwidth. In this example, the bandwidth of the signal relative to the sample bandwidth is not large enough to require compensation by H5 and H7 as the double fold of the 3rd order distortion does not overlap with the main signal. This condition exists when the signal is centered in the Nyquist bandwidth and the signal bandwidth is less than fsamp/4.

Calibration signals that would work for this system are defined in Table 1. For DFT analysis, a value of Ndft=$2^N$ is assumed (for example Ndft=8192); Ndft is the number of samples used by the DFT module.

TABLE 1

Calibration signals for Nyquist centered signals and bandwidth less that fsamp/4

| Cal Signal | Fc (MHz) | Δf (MHz) | ϵ (MHz) | Coefficients Calibrated |
|---|---|---|---|---|
| 1 | 1747.5 | (16/128) * 307.2 | 307.2/Ndft | $H_1, H_2, H_3$ |
| 2 | 1747.5 | (5/128) * 307.2 | 307.2/Ndft | $H_4, H_6$ |

With Calibration (Cal) Signal 1, the H1, H2, and H3 distortion terms will occur approximately near fsamp/4, the center of the bandwidth of interest (after aliasing). These bin locations are preferred when memory is relatively weak and the compensation coefficients can be complex scalars. For systems with non-negligible memory, additional Cal Signals (with smaller Δf) are required to characterize the change in required compensation vs. frequency. From this information, a FIR filter for H can be identified.

With Cal Signal 2, we can ignore the second order distortion terms and focus on the third order distortion terms. With the two-tone test signal, two distortion tones will occur in-band for the H4 compensation component. The required compensation coefficient is determined for each of the two distortion tones. If the two determined coefficients are similar, then H4 can be defined as a complex scalar set in value to the average of the two determined coefficients. If the two determined coefficients are suitably different and suitably large, then H4 is defined as a FIR to impart the differing compensation at the different frequencies. With the same two-tone test signal, four distortion tones will occur in-band for the H6 compensation component. However, two of these will lie close to the input signal tone frequencies and will be ignored due to possible contamination by phase noise. In a manner similar to that for H4, the required compensation coefficient is determined for the two remaining distortion tones and this information is used to appropriately define H6 as a complex scalar or FIR filter.

Next, consider a second system in which the signal bandwidth exceeds fsamp/4. In this situation, the double folds of the 3rd order distortion will overlap with the signal bandwidth and will need to be compensated using compensation components controlled by H5 and H7.

The example system is similar to the earlier example system, having the same RF center frequency and signal bandwidth, but having a different IF frequency and ADC sampling rate. In this example, an IF frequency of 184.32 MHz is used with an ADC sample rate of 245.76 MHz. As before, the IF signal is in the center of the second Nyquist band but now the signal occupies approximately 61% of the Nyquist band. Since the signal bandwidth is greater than fsamp/4, this results in the need for the H5 and H7 compensation terms.

The preferred calibration signals for this system are defined in Table 2. For DFT analysis, a value of Ndft=$2^N$ is assumed (such as Ndft=8192).

TABLE 2

Calibration signals for Nyquist centered signals with bandwidth greater than fsamp/4

| Cal Signal | Fc (MHz) | Δf (MHz) | ϵ (MHz) | Coefficients Calibrated |
|---|---|---|---|---|
| 1 | 1747.5 | (19/128) * 245.76 | 245.76/Ndft | $H_1, H_2, H_3, H_5, H_7$ |
| 2 | 1747.5 | (6/128) * 245.76 | 245.76/Ndft | $H_4, H_6$ |

With Cal Signal 1, the H1, H2, and H3 distortion terms will occur in-band, but not as close to fsamp/4 as with Cal Signal 1 from Table 1. The benefit of the signal as defined in Table 2 is that it will also generate distortion tones suitable for calibration of H5 and H7. For H5, two distortion tones are created. The required coefficient for each of these tones is determined and compared. If they are suitably similar, then H5 is defined as a complex scalar set with a value equal to the average of the two determined coefficients. If the two determined coefficients are suitably different and suitably large, then H5 is defined as a FIR to impart the differing compensation at the different frequencies. For H7, four distortion tones are created; however, two of them will lie close in frequency to the original input signals, so they will not be analyzed. From the remaining two distortion tones, H7 is suitably defined as a complex scalar or FIR filter. Cal Signal 2 in Table 2 provides similar functionality as Cal Signal 2 in Table 1.

Figure 15:
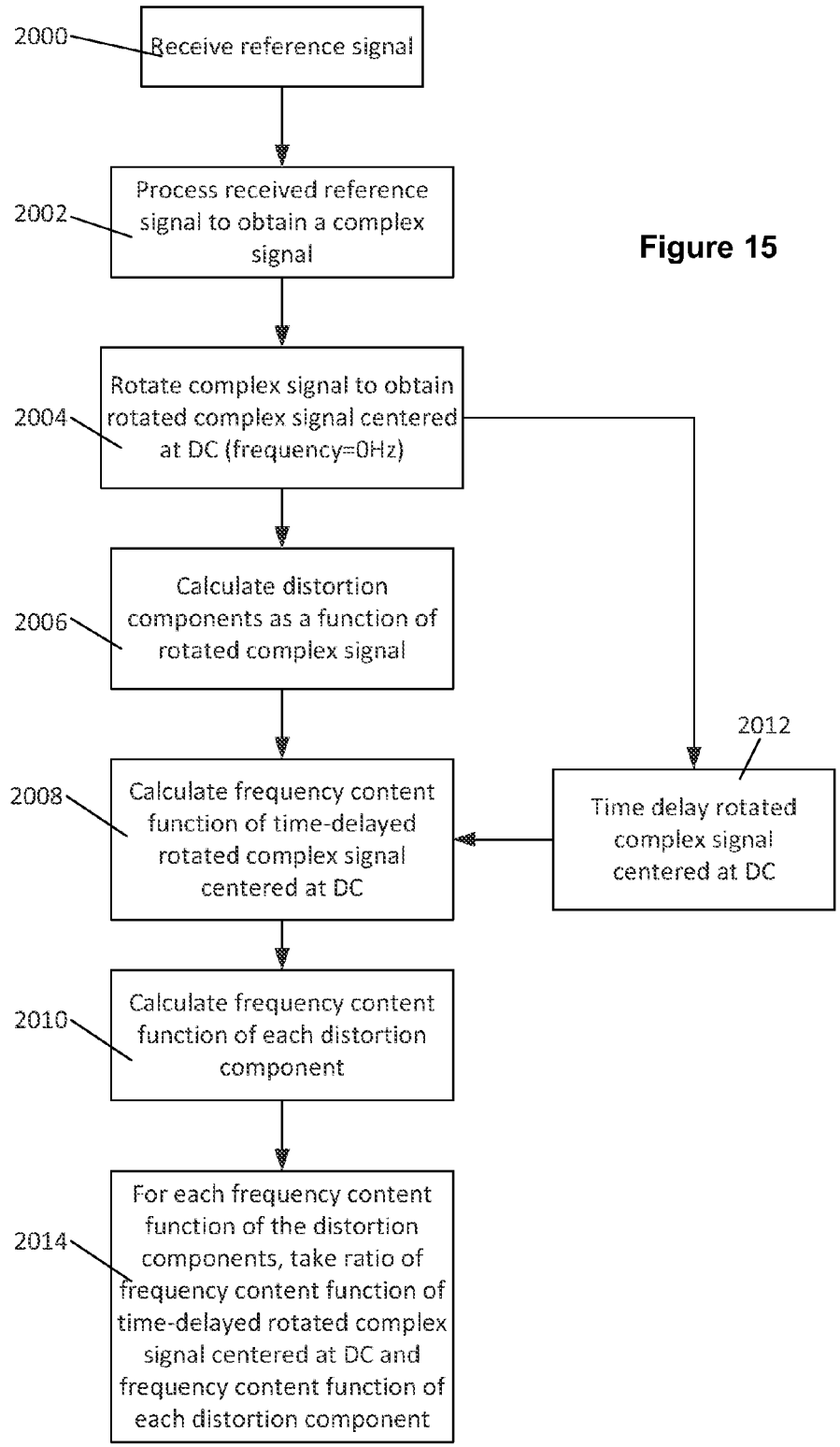
FIG. 15 shows a flowchart of a calibration method in accordance with the present disclosure.

FIG. 15 shows a flowchart of a method of calculating the above-noted coefficients (e.g., H1-H7), according to certain embodiments of the present disclosure. At action 2000, a digitized RF reference signal is received, having traversed an RF transmitter to be calibrated, is received and, at action 2002, is converted into a complex baseband signal. At action 2004, the complex baseband signal is rotated to obtain a rotated complex baseband signal at 0 Hz. At 2006, as a function of the rotated complex baseband signal, compensation distortion components for a set of pre-determined distortion orders are calculated. At action 2012, the rotated complex baseband signal at 0 Hz is time delayed by a pre-determined period. At action 2008, a frequency content function of the rotated complex baseband signal at 0 Hz is calculated and, at action 2010, a frequency content function of the each of the compensation distortion component is calculated. Subsequently, for each particular compensation distortion component, the frequency content function of the a rotated complex baseband signal at 0 Hz is divided by the frequency content function of the particular distortion component to obtain the compensation distortion components coefficient (or factor) of the particular distortion component.

Figure 16:
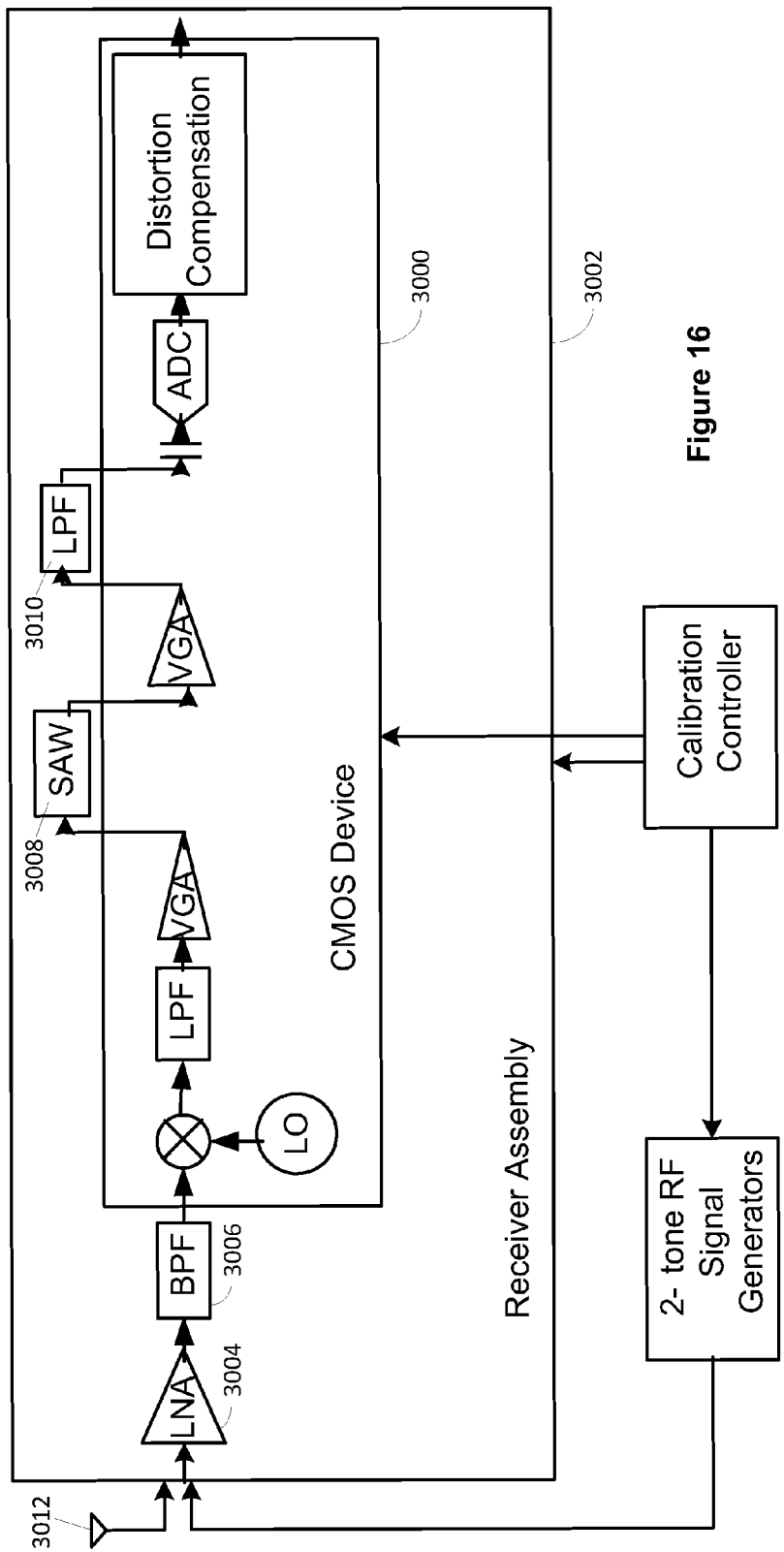
FIG. 16 shows an integrated CMOS device in accordance with the present disclosure.

FIG. 16 shows another embodiment of the present disclosure. FIG. 16 shows an integrated CMOS device 3000 in accordance with the present disclosure, the CMOS device is incorporated within a larger Receiver Assembly 3002. In addition to the integrated CMOS device 3000, the receiver assembly also includes an RF Low Noise Amplifier (LNA) 3004, an RF bandpass filter 3006, and additional IF frequency filtering 3008 and 3010 that can be done with components external to the integrated CMOS device 3000. External to the receiver assembly is an interface to the antenna 3012, often through a diplexer that allows the transmitter assembly and the receiver assembly to share the same antenna. During factory calibration, the receiver assembly 3002 is connected to a calibration controller 3014 and a test signal generator 3016 for generating the required 2-tone calibration signals. The calibration controller 3014 coordinates the various aspects of calibration, including control of test signals, environmental conditions, and analysis of data to determine the required calibration coefficients.

It is important that devices built in accordance with the present disclosure be calibrated when incorporated into the entire receiver assembly, as characteristics of the external RF and IF signal components will impact the required calibration coefficients.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A method to compensate for non-linearity distortion in a radio frequency (RF) receiver, the RF receiver outputting a digitized RF signal, the method comprising:
    converting the digitized RF signal into a complex baseband signal;
    rotating the complex baseband signal to obtain a rotated complex baseband signal at 0 Hz;
    calculating, as a function of the rotated complex baseband signal, compensation distortion components for a set of pre-determined distortion orders, the compensation distortion components including at least one of harmonic distortion components and intermodulation distortion components; and
    subtracting the compensation distortion components from the rotated complex baseband signal to obtain a compensated complex baseband signal.

2. The method of claim 1 wherein calculating compensation distortion components includes calculating a complex conjugate of some of the at least one of harmonic distortion components and intermodulation distortion components, to obtain one or more complex conjugates.

3. The method of claim 1 wherein calculating compensation distortion components includes rotating at least one of the at least one of harmonic distortion components and intermodulation distortion components to be in alignment with the distortion components of the rotated complex baseband signal at 0 Hz.

4. The method of claim 2 wherein calculating compensation distortion components includes rotating at least one of the one or more complex conjugates to be in alignment with the distortion components of the rotated complex baseband signal at 0 Hz.

5. The method of claim 1 wherein calculating compensation distortion components further includes multiplying each of the at least one of harmonic distortion components and intermodulation distortion components by a respective multiplier function.

6. The method of claim 5 wherein the each respective multiplier function can be a scalar or a finite impulse response.

7. The method of claim 1 wherein:
    calculating compensation distortion components is effected in a calculation time period; and
    the method further comprises an action of delaying, in time, the rotated complex baseband signal at 0 Hz, by the calculation time period, prior to subtracting the compensation distortion components from the rotated complex baseband signal at 0 Hz.

8. The method of claim 1 wherein the set of pre-determined distortion orders includes second order and third order.

9. The method of claim 1 wherein:
    the digitized RF signal has an undistorted signal component; and
    calculating the compensation distortion components is effected in accordance with the frequency position of the undistorted signal component and a sampling frequency at which the digitized RF signal was generated.

10. The method of claim 9 wherein:
    the undistorted signal component has a bandwidth; and
    calculating the compensation distortion components is effected in accordance with the bandwidth.

11. The method of claim 9 wherein calculating the compensation distortion components includes:
    calculating at least one of harmonic distortion components and intermodulation distortion components;
    calculating a complex conjugate of some of the at least one of harmonic distortion components and intermodulation distortion components, to obtain one or more complex conjugates; and
    rotating at least one of the at least one of harmonic distortion components and intermodulation distortion components by a fraction of the sampling frequency to be in alignment with the distortion components of rotated complex baseband signal at 0 Hz.

12. The method of claim 1 further comprising conditioning the compensated complex baseband signal.

13. A method of calculating compensation distortion components factors, the compensation distortion components to compensate for non-linearity distortion in a radio frequency (RF) receiver, the method comprising:
    receiving, from the RF receiver, a digitized RF reference signal;
    converting the digitized RF reference signal into a complex baseband signal;
    rotating the complex baseband signal to obtain a rotated complex baseband signal at 0 Hz;
    calculating, as a function of the rotated complex baseband signal, compensation distortion components for a set of pre-determined distortion orders;

calculating a frequency content function of the a rotated complex baseband signal at 0 Hz;

calculating a frequency content function of the each of the compensation distortion component; and for each particular compensation distortion component, dividing the frequency content function of the a rotated complex baseband signal at 0 Hz by the frequency content function of the particular distortion component to obtain the compensation distortion components factor of the particular distortion component.

14. The method of claim 13 wherein calculating a frequency content function of the rotated complex baseband signal at 0 Hz and calculating a frequency content function of each of the compensation distortion components, respectively includes taking the discrete Fourier transform of the rotated complex baseband signal at 0 Hz and of each of the compensation distortion components.

15. A non-transitory, tangible computer-readable medium having recorded thereon instructions to be carried out by a processor to perform a method to compensate for non-linearity distortion in a radio frequency (RF) receiver, the RF receiver outputting a digitized RF signal, the method comprising:

converting the digitized RF signal into a complex baseband signal;

rotating the complex baseband signal to obtain a rotated complex baseband signal at 0 Hz;

calculating, as a function of the rotated complex baseband signal, compensation distortion components for a set of pre-determined distortion orders, the compensation distortion components including at least one of harmonic distortion components and intermodulation distortion components; and subtracting the compensation distortion components from the rotated complex baseband signal to obtain a compensated complex baseband signal.

16. The computer-readable medium of claim 15 wherein calculating compensation distortion components includes calculating a complex conjugate of some of the at least one of harmonic distortion components and intermodulation distortion components, to obtain one or more complex conjugates.

17. The computer-readable medium of claim 15 wherein calculating compensation distortion components includes rotating at least one of the at least one of harmonic distortion components and intermodulation distortion components to be in alignment with the distortion components of the rotated complex baseband signal at 0 Hz.

18. The computer-readable medium of claim 16 wherein calculating compensation distortion components includes rotating at least one of the one or more complex conjugates to be in alignment with the distortion components of the rotated complex baseband signal at 0 Hz.

19. The computer-readable medium of claim 15 wherein calculating compensation distortion components further includes multiplying each of the at least one of harmonic distortion components and intermodulation distortion components by a respective multiplier function.

20. The computer-readable medium of claim 19 wherein the each respective multiplier function can be a scalar or a finite impulse response.

21. The computer-readable medium of claim 15 wherein:
calculating compensation distortion components is effected in a calculation time period; and
the method further comprises an action of delaying, in time, the rotated complex baseband signal at 0 Hz, by the calculation time period, prior to subtracting the compensation distortion components from the rotated complex baseband signal at 0 Hz.

22. The computer-readable medium of claim 15 wherein the set of pre-determined distortion orders includes second order and third order.

23. The computer-readable medium of claim 15 wherein:
the digitized RF signal has an undistorted signal component; and
calculating the compensation distortion components is effected in accordance with the frequency position of the undistorted signal component and a sampling frequency at which the digitized RF signal was generated.

24. The computer-readable medium of claim 23 wherein:
the undistorted signal component has a bandwidth; and
calculating the compensation distortion components is effected in accordance with the bandwidth.

25. The computer-readable medium of claim 23 wherein calculating the compensation distortion components includes:
calculating at least one of harmonic distortion components and intermodulation distortion components;
calculating a complex conjugate of some of the at least one of harmonic distortion components and intermodulation distortion components, to obtain one or more complex conjugates; and
rotating at least one of the at least one of harmonic distortion components and intermodulation distortion components by a fraction of the sampling frequency to be in alignment with the distortion components of rotated complex baseband signal at 0 Hz.

26. The computer-readable medium of claim 15 wherein the method further comprises conditioning the compensated complex baseband signal.

27. A non-transitory, tangible computer-readable medium having recorded thereon instructions to be carried out by a processor to perform a method of calculating compensation distortion components factors, the compensation distortion components to compensate for non-linearity distortion in a radio frequency (RF) receiver, the method comprising:

receiving, from the RF receiver, a digitized RF reference signal;

converting the digitized RF reference signal into a complex baseband signal;

rotating the complex baseband signal to obtain a rotated complex baseband signal at 0 Hz;

calculating, as a function of the rotated complex baseband signal, compensation distortion components for a set of pre-determined distortion orders;

calculating a frequency content function of the a rotated complex baseband signal at 0 Hz;

calculating a frequency content function of the each of the compensation distortion component; and for each particular compensation distortion component, dividing the frequency content function of the a rotated complex baseband signal at 0 Hz by the frequency content function of the particular distortion component to obtain the compensation distortion components factor of the particular distortion component.

28. The computer-readable medium of claim 27 wherein calculating a frequency content function of the rotated complex baseband signal at 0 Hz and calculating a frequency content function of each of the compensation distortion components, respectively includes taking the discrete Fourier transform of the rotated complex baseband signal at 0 Hz and of each of the compensation distortion components.

* * * * *